(12) United States Patent
Benson

(10) Patent No.: US 10,029,399 B2
(45) Date of Patent: Jul. 24, 2018

(54) METHOD FOR PRODUCING A CORE BRUSH COMPRISING POLYVINYL FORMALIN BRISTLES

(71) Applicant: Coastal PVA OPCO, LLC, Woodland, CA (US)

(72) Inventor: Briant E. Benson, Taft, CA (US)

(73) Assignee: COASTAL PVA OPCO, LLC, Woodland, CA (US)

( * ) Notice: Subject to any disclaimer, the term of this patent is extended or adjusted under 35 U.S.C. 154(b) by 0 days.

(21) Appl. No.: 15/465,979

(22) Filed: Mar. 22, 2017

(65) Prior Publication Data

US 2017/0274565 A1    Sep. 28, 2017

Related U.S. Application Data

(60) Provisional application No. 62/312,385, filed on Mar. 23, 2016.

(51) Int. Cl.

| B28B 11/06 | (2006.01) |
| B29C 39/02 | (2006.01) |
| B29B 11/14 | (2006.01) |
| B29C 37/00 | (2006.01) |
| B29C 39/10 | (2006.01) |
| B29K 627/06 | (2006.01) |
| B29K 31/00 | (2006.01) |
| B29K 105/20 | (2006.01) |
| B29L 31/42 | (2006.01) |

(52) U.S. Cl.
CPC ............ B29C 39/026 (2013.01); B29B 11/14 (2013.01); B29C 37/0025 (2013.01); B29C 39/028 (2013.01); B29C 39/10 (2013.01); B29K 2031/04 (2013.01); B29K 2105/20 (2013.01); B29K 2627/06 (2013.01); B29L 2031/42 (2013.01)

(58) Field of Classification Search
CPC ... B29C 39/026; B29C 37/0017; B29C 41/14; B29C 41/36; B29C 41/42; B29C 39/10
See application file for complete search history.

(56) References Cited

U.S. PATENT DOCUMENTS

2006/0151003 A1* 7/2006 Liou .................... B08B 1/04
 134/2
2006/0276108 A1* 12/2006 Benson ............ A46B 13/008
 451/41

* cited by examiner

*Primary Examiner* — Stella K Yi
(74) *Attorney, Agent, or Firm* — Temmerman Law Office Mathew J. Temmerman

(57) ABSTRACT

A method of producing a brush for the cleaning of electronic components. In this method, a plastic core is prepared and submerged into a solvent to melt the outer surface of the core. While the outer surface of the plastic core is still partially melted, it is rolled through a trough of powdered polyvinyl alcohol (PVA) such that granules of PVA melt into and subsequently become embedded at the outer surface. As the solvent evaporates, the outer surface of the core re-hardens and the granules of PVA become firmly entrapped at the outer surface. The PVA covered shaft is placed in a mold, which is then filled with a PVA solution. As the solution cures, it forms a strong bond with the PVA granules that are embedded at the surface of the plastic core. Thereafter, the mold components are disassembled, leaving behind the finished cored brush.

27 Claims, 6 Drawing Sheets

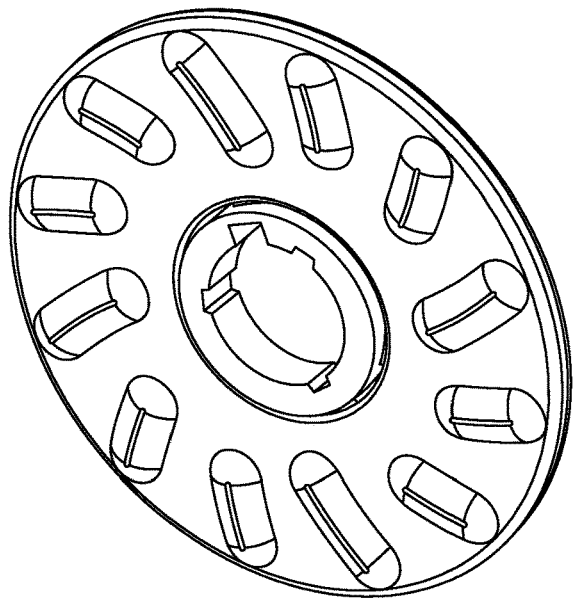
FIG. 1 - Prior Art
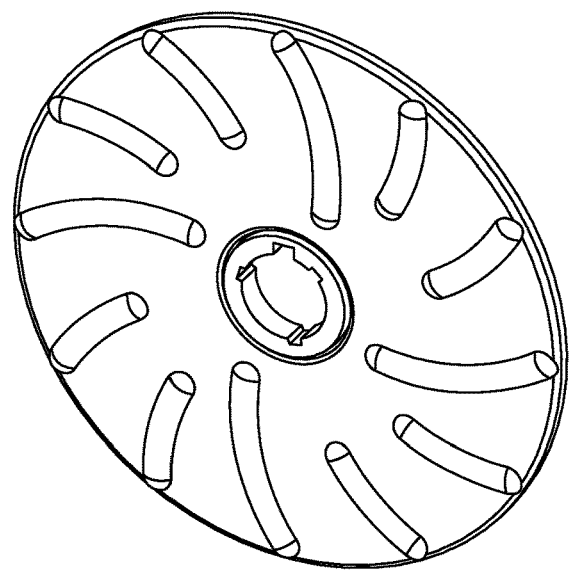
FIG. 2 - Prior Art

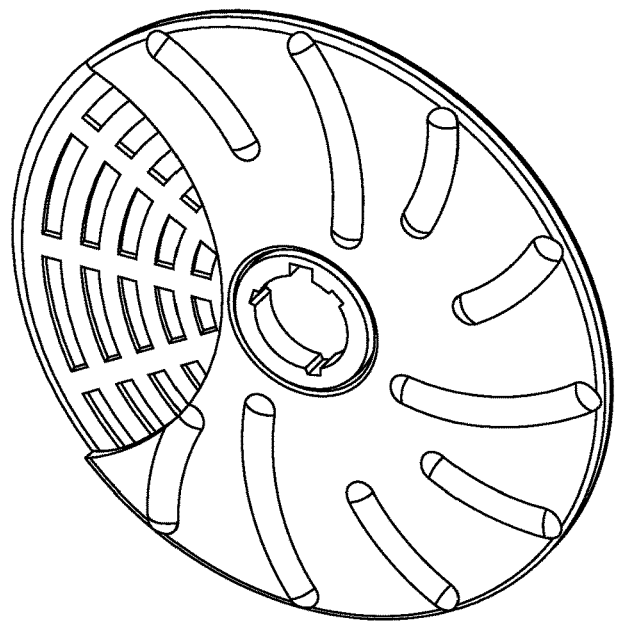
FIG. 3 - Prior Art
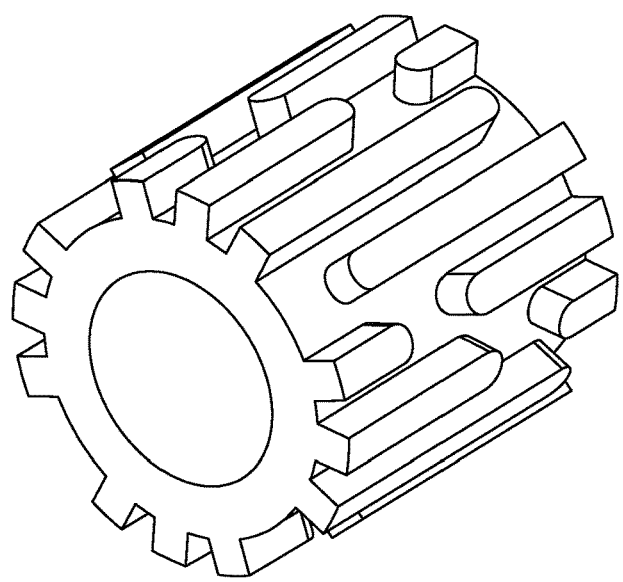
FIG. 4 - Prior Art

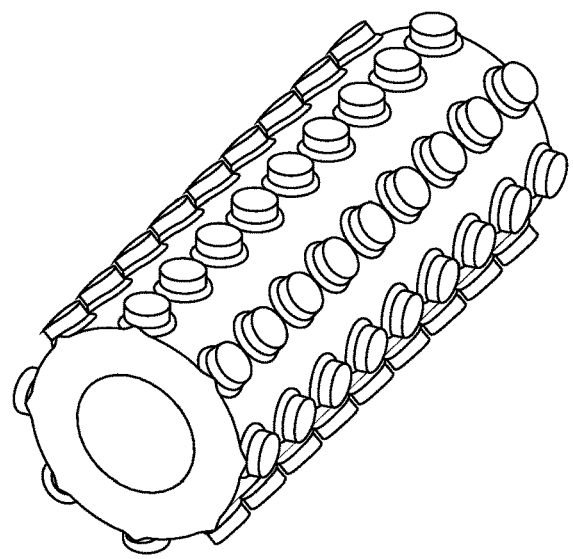
FIG. 5 - Prior Art
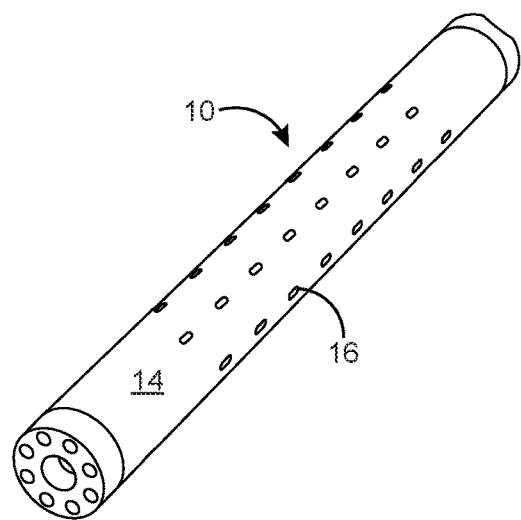
FIG. 6

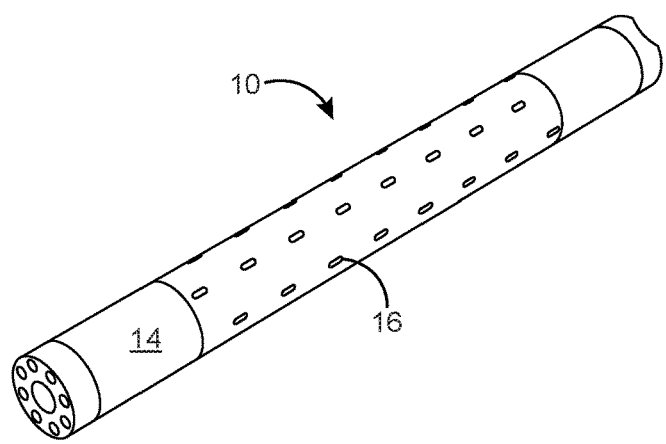
FIG. 7
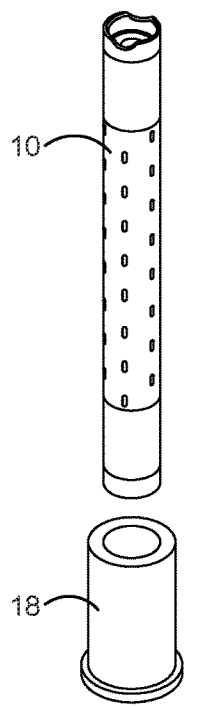 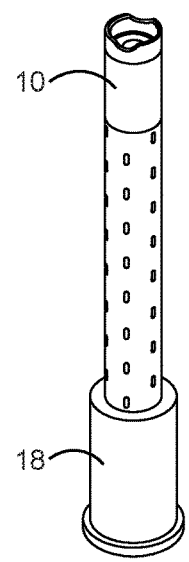
FIG. 8A          FIG. 8B

METHOD FOR PRODUCING A CORE BRUSH COMPRISING POLYVINYL FORMALIN BRISTLES

RELATED APPLICATIONS

This application claims priority from the U.S. provisional application with Ser. No. 62/312,385, which was filed on Mar. 23, 2016. The disclosure of that provisional application is incorporated herein as if set out in full.

BACKGROUND OF THE DISCLOSURE

Technical Field of the Disclosure

The present disclosure relates generally to the manufacturing of brushes for cleaning electronic components, and more particularly to a method for producing a cored brush comprising polyvinyl formalin bristles.

Description of the Related Art

A step in the manufacturing process of certain electronic components such as computer hard drive disks and silicon wafers is cleaning the components with specialized brushes. One such type of brush comprises bristles of cured PVA, or polyvinyl formalin. Polyvinyl formalin is a tough sponge-like material which is formed by pouring PVA into a mold and heating it.

In existing systems, the end product after the PVA solution is cured is a brush similar to that shown in prior art FIGS. 1-3 where the bristles are made up of polyvinyl formalin material. FIG. 1 shows a small diameter "Arc Fin" brush, FIG. 2 shows a large diameter "Arc Fin" brush, and FIG. 3 shows a cutaway view of a plastic core that is present in all Arc Fin style brushes such as those depicted in FIGS. 1 and 2. The Arc Fin brushes depicted in FIGS. 1 and 2 are manufactured by casting PVA over the plastic core depicted in FIG. 3 which as shown comprises a plurality of channels that pass through from a first face to an opposite and second face.

During the manufacturing of brushes such as those described above, the core (shown in FIG. 3) is placed in a plastic mold having an interior surface defining a cavity which is a negative shape of the desired final geometry of the product as is well known in the art of molding. An uncured liquid PVA solution is introduced into the cavity where it flows around the core and through the channels of the plastic core. Next, the PVA is cured by elevating its temperature during which the PVA transforms into a white spongy material. With the liquid now solid, the core and the sponge are bound together via mechanical entrapment of the core within the cast sponge. While there is some level of adhesion between the PVA and the plastic, the adhesion is minimal and not sufficient to hold the brush together alone, particularly when the finished device is in use. Instead, the geometry of the hardened components is primarily responsible for maintaining their tight fit to one another, rather than any chemical bonding between the two components.

As shown in FIGS. 1-3, the center point of the brush includes a keyed center hole that provides for a tight fit to a shaft (not shown) to which the brush will be mounted. In use, the final product shaft and brush are submerged in a chemical bath, and then rotated. Finally, the rotating brush is pressed against the surface to be cleaned.

FIGS. 4 and 5 illustrate examples of cylindrical brushes made via the PVA cast process according to the above-mentioned description. FIG. 4 depicts a cylindrical brush having elongated nodules and FIG. 5 depicts a cylindrical brush having round nodules and a cylindrical center hole running longitudinally therethrough. As a component of a cleaning system, the brush may be mounted to a shaft by sliding the shaft (not shown) through the center hole. The shaft and its tight fit provide further rigidity to the brush. The mounting process is typically performed by the end user.

Once the brush is mounted to the shaft, the shaft is rotated thereby causing the brush to rotate where it is used for cleaning hard disk drives, silicon wafers, and other sensitive electronic components during the manufacturing process of those components. Although such systems work reasonably well, there are nevertheless drawbacks and additional improvements of the conventional cleaning brush are needed.

It has been considered to simplify the process by providing a unified core and brush system; that is, a brush pre-mounted on a polymer core. A drawback to the conventional method of manufacturing brushes such as those described above is that the PVA, the primary component in the PVA solution used in the casting of the polyvinyl formalin bristles does not readily adhere to the surface of the plastic core. This weak mechanical unification between the core and the brush provides a great deficiency to such systems. The entire assembly is spun about a center axis running the length of the cylinder and the brushes are pressed against the surface of the object to be cleaned, and the cleaning chemical is applied via physical contact from the brushes. During this process, torque is generated on the brush in the opposite direction of rotation. The presence of this torque can cause the core and the brush to become dislodged from one another. Thus, it is imperative that they be mechanically unified to prevent slippage between the two and to maintain the same rotational velocity in the brush as present in the core.

In some other conventional systems, the weak connection between the plastic core and the PVA solution is not an issue because of the lock and key type assembly of those structures. Further, in those systems and other systems the fact that PVA does not adhere is actually desirable because it facilitates the manufacturing process by allowing the cured PVA to be easily separated from the mold after casting. One conventional method anticipated to alleviate the afore-mentioned problems is to use metal rods and cavities to which the PVA may bind. However, this method fails because the PVA in its liquid state contains highly concentrated sulfuric acid which can cause serious damage to the user.

There is thus a need for a method to produce a brush pre-mounted or integral with a polymer core. Such a needed method would provide strong mechanical bonding between the core and the brush to prevent slippage between them. Further, such a method would allow the PVA to firmly adhere with the plastic core. These and other objectives are accomplished by the present embodiment.

SUMMARY OF THE INVENTION

To minimize the limitations found in the prior art, and to minimize other limitations that will be apparent upon the reading of the specification, the preferred embodiment of the present invention provides a method for producing a brush for the cleaning of sensitive electronic components. In this method, a plastic core or substrate such as chlorinated polyvinyl chloride (CPVC) is prepared and submerged into a solvent such as tetrahydrofuran (THF) to melt the outer surface of the core. While the outer surface of the plastic core is still partially melted, it is rolled through a trough of powdered polyvinyl alcohol (PVA) such that granules of PVA melt into and subsequently become embedded at the outer surface. As the solvent evaporates, the surface of the core re-hardens and the granules of PVA become entrapped. The PVA covered core is then placed in a mold, which is then filled with a PVA solution. As the solution cures, it forms a strong bond with the PVA granules that are embedded in the surface of the plastic core. Thereafter, the mold components are disassembled, leaving behind the finished cored brush.

A first objective of the present invention is a method for producing a cored brush for cleaning electronic components.

A second objective of the present invention is to provide a method for producing a cored brush pre-mounted or integral with a plastic core.

A third objective of the present invention is to provide a method for creating a strong mechanical bond between a plastic core and a cored brush to prevent slippage between them.

A further objective of the present invention is to provide a method for producing a cored brush that allows granules of polyvinyl alcohol (PVA) to firmly adhere with the plastic core.

These and other advantages and features of the present invention are described with specificity so as to make the present invention understandable to one of ordinary skill in the art.

BRIEF DESCRIPTION OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention, thus the drawings are generalized in form in the interest of clarity and conciseness.

FIG. 1 is a perspective view of an existing type of small diameter "arc fin" brush;

FIG. 2 is a perspective view of an existing type of large diameter "arc fin" brush;

FIG. 3 is a perspective view of an existing type of arc fin brush with a partial cutaway view of a plastic core present within;

FIG. 4 is a perspective view of an existing type of cylindrical brush having elongated nodules;

FIG. 5 is a perspective view of an existing type of cylindrical brush having round nodules;

FIG. 6 is a perspective view of a plastic core in accordance with the preferred embodiment of the present invention;

FIG. 7 is a perspective view of a flocked plastic core in accordance with the preferred embodiment of the present invention;

FIGS. 8A and 8B are perspective views showing the flocked core being loaded into a base of a mold in accordance with the preferred embodiment of the present invention;

DETAILED DESCRIPTION OF THE DRAWINGS

Figures 9A, 9B, 9C, 9D:
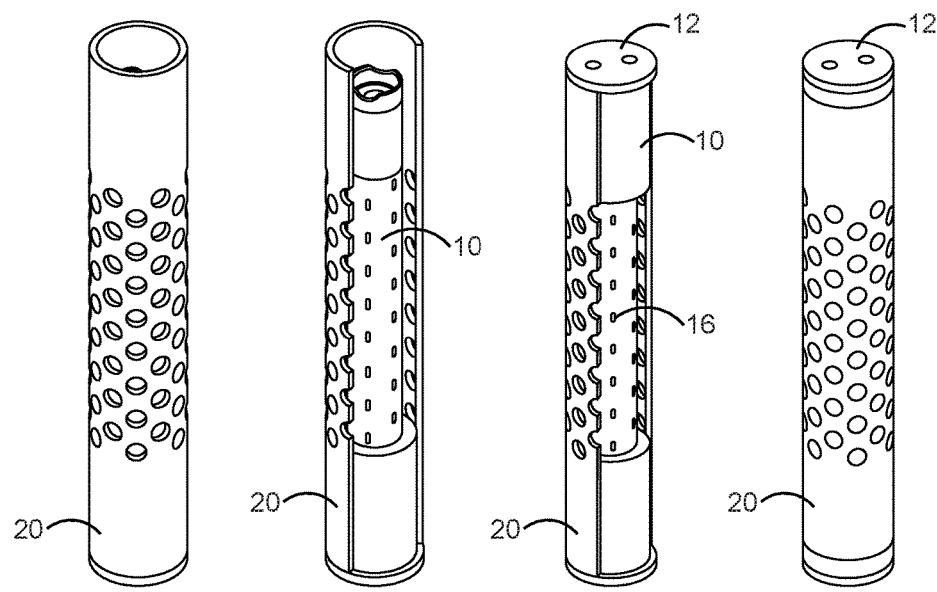
FIG. 9A shows a perspective view of a mold cavity to position the flocked core thereinside in accordance with the preferred embodiment of the present invention.
FIG. 9B shows a perspective view of the present invention, illustrating a partially closed mold cavity positioned with the flocked core thereinside in accordance with the preferred embodiment of the present invention.
FIG. 9C shows a perspective view of the present invention, illustrating the flocked core attached with a plurality of end caps in accordance with the preferred embodiment of the present invention.
FIG. 9D shows a perspective view of the mold cavity filled with a molding solution in accordance with the preferred embodiment of the present invention.

In the following discussion that addresses a number of embodiments and applications of the present invention, reference is made to the accompanying drawings that form a part hereof, and in which is shown by way of illustration specific embodiments in which the invention may be practiced. It is to be understood that other embodiments may be utilized and changes may be made without departing from the scope of the present invention.

Various inventive features are described below that can each be used independently of one another or in combination with other features. However, any single inventive feature may not address any of the problems discussed above or only address one of the problems discussed above. Further, one or more of the problems discussed above may not be fully addressed by any of the features described below.

As used herein, the singular forms "a", "an" and "the" include plural referents unless the context clearly dictates otherwise. "And" as used herein is interchangeably used with "or" unless expressly stated otherwise. As used herein, the term 'about" means +/−5% of the recited parameter. All embodiments of any aspect of the invention can be used in combination, unless the context clearly dictates otherwise.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "wherein", "whereas", "above," and "below" and words of similar import, when used in this application, shall refer to this application as a whole and not to any particular portions of the application.

The description of embodiments of the disclosure is not intended to be exhaustive or to limit the disclosure to the precise form disclosed. While the specific embodiments of, and examples for, the disclosure are described herein for illustrative purposes, various equivalent modifications are possible within the scope of the disclosure, as those skilled in the relevant art will recognize.

Referring to FIGS. 6-11, a method for producing a cored brush 22 (see FIG. 10) from a plastic substrate 10 for cleaning electronic components is illustrated. In the preferred method, the plastic substrate 10 is a cylindrical core as shown in FIG. 6. The core or plastic substrate 10 comprises a polymer plastic such as, but not limited to, chlorinated polyvinyl chloride (CPVC). The plastic core 10 is preferably hollow and includes an outer surface 14, a plurality of end caps 12 (see FIG. 9C) and a hollow inner surface (not shown). The plurality of end caps 12 (see FIG. 9C) is preferably machined out of CPVC. The hollow core 10 is manufactured directly as such through a molding process, or is hollowed out after curing of the CPVC.

As shown in FIG. 7, the preferred method utilizes a flocking mechanism to melt the outer surface 14 of the plastic core 10 by masking the plurality of end caps 12 (see FIG. 9C) and dipping the plastic core 10 in an organic solvent. The organic solvent may be preferably tetrahydrofuran, $(CH_2)_4O$ (THF) or another organic solvent that melts and preps the outer surface 14 of the core 10. Although THF is preferred, radiant heat or other means of imparting heat to the core 10 may also be used to melt the outer surface 14. The disadvantages in using heat as opposed to a chemical melting agent such as THF are that the short working time (the core 10 cools down once heat is removed) and the difficulty in manually handling the heated core 10 because of its high temperature. Regardless of how the outer surface 14 is melted, before it solidifies, the flocked core 10 is rolled in PVA powder. Preferably, the PVA powder is a fine white powder that adheres to the melted outer surface 14. Rolling the flocked core 10 in the PVA powder immediately after melting of the outer surface 14 of the core 10 causes the granules of PVA to become firmly imbedded in the soft outer surface 14 of the plastic core 10. As the organic solvent evaporates, the outer surface 14 of the core 10 re-hardens and granules of PVA become entrapped. The masking is then removed in order to complete the flocking process.

FIGS. 8A and 8B show the flocked core 10 embedded with the PVA granules being loaded into a base 18 of a mold. Thereafter, as shown in FIGS. 9A and 9B, a mold cavity 20 is placed on top of the core 10. Next, as shown in FIG. 9C, the plurality of end caps 12 are attached with the core 10 and a plurality of holes 16 at the outer surface 14 is covered. The plurality of holes 16 is designed to form a plurality of brush nodules 24 (see FIG. 10) to clean various sensitive electronic components. An interior surface of the mold defines the mold cavity 20 which has a negative shape of the desired final geometry of the cored brush 22 (see FIG. 10). As shown in FIG. 9D, a molding solution is filled in the mold cavity 20. Preferably, the molding solution is an uncured PVA solution having PVA granules, formaldehyde, sulfuric acid, deionized water, and starch. The molding solution is introduced into the mold cavity 20 where it flows around the core 10. Next, the temperature is increased to a curing temperature at which the PVA is cured. As the molding solution cures, it forms a strong bond with the PVA granules firmly attached with the outer surface 14 of the plastic core 10. Thereafter, the mold components are disassembled, leaving behind the finished cored brush 22.

Figure 10:
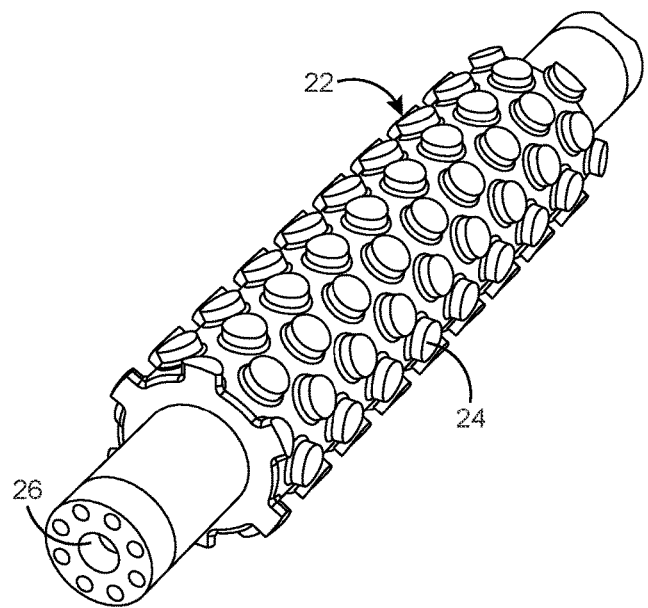
FIG. 10 is a perspective view of a cylindrical cored brush in accordance with the preferred embodiment of the present invention.

FIG. 10 shows the cylindrical cored brush 22 mechanically or chemically bonded to an internal core 10. The brush 22 is produced based on the aforementioned method. The brush 22 is thus of a single piece construction that does away with the two-part construction process of the conventional method, and all of the limitations inherent therein. Here, one end of the cylindrical shaped brush 22 comprises a through-hole 26 at its center such that a cleaning chemical can be passed therethrough while in use. The cleaning chemical makes its way down the length of the cylindrical brush 22 and passes through the array of holes 16 in the cylinder and into the nodules 24 utilizing the fluid pressure applied by the system and the centrifugal force due to rotation.

Figure 11:
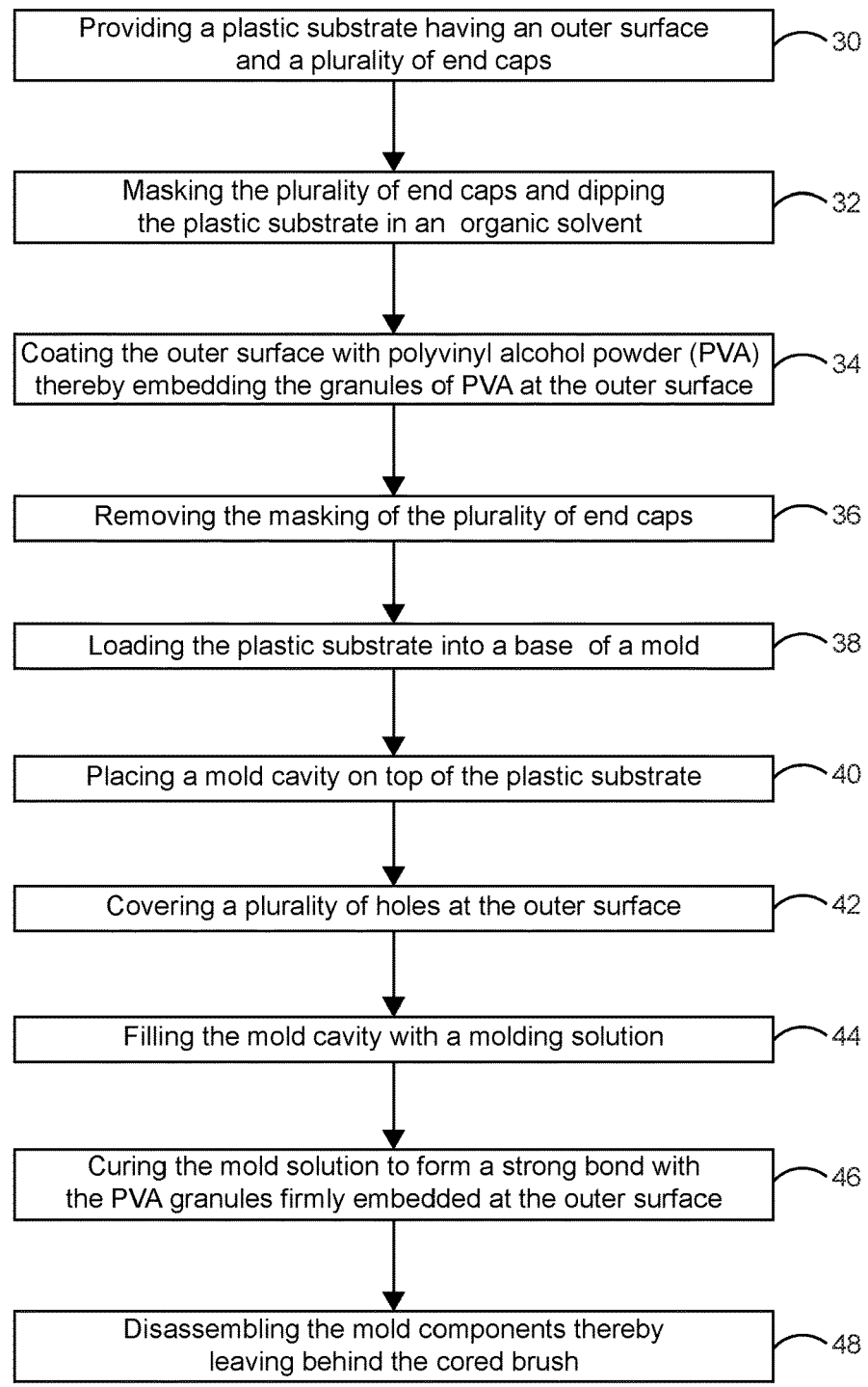
FIG. 11 shows a flowchart of a method for producing the cored brush in accordance with the preferred embodiment of the present invention.

FIG. 11 shows a flowchart of the method for producing the cored brush 22. The method commences by providing the plastic core as shown in block 30. Next, the core is flocked by masking the plurality of end caps and dipping the plastic substrate in the organic solvent as shown in block 32. The outer surface is coated with PVA to embed the granules of PVA as shown in block 34. Thereafter, the masking of the plurality of end caps is removed as shown in block 36. The plastic substrate is loaded into the base of the mold as shown in block 38. Thereafter, the mold cavity is placed on top of the plastic substrate as shown in block 40. Then, the plurality of holes at the outer surface is covered as shown in block 42. The mold cavity is then filled with a molding solution as shown in block 44. Upon filling, the mold solution is cured to form a strong bond with the PVA granules firmly embedded at the outer surface as shown in block 46. Finally, the mold components are disassembled thereby leaving behind the cored brush as shown in block 48.

The foregoing description of the preferred embodiment of the present invention has been presented for the purpose of illustration and description. It is not intended to be exhaustive or to limit the invention to the precise form disclosed. Many modifications and variations are possible in light of the above teachings. For instance, although cylindrical cores 10 and brushes 22 are disclosed, cores 10 with cross-sections ranging between three sides (triangular) and infinite sides (circular) are disclosed. It is intended that the scope of the present invention not be limited by this detailed description, but by the claims and the equivalents to the claims appended hereto.

What is claimed is:

1. A method for producing a cored brush, the method comprising the steps of:
   a) providing a plastic substrate having an outer surface;
   b) melting the plastic substrate outer surface with an organic solvent;
   c) coating the outer surface with polyvinyl alcohol (PVA) powder thereby embedding PVA granules at the outer surface;
   d) loading the plastic substrate into a base of a mold;
   e) placing a mold cavity around the plastic substrate;
   f) filling the mold with a molding solution;
   g) curing the molding solution to form a strong bond with the PVA granules; and
   h) disassembling the mold thereby leaving behind the cored brush.

2. The method of claim 1 wherein the step b) further includes masking of a plurality of end caps of the plastic substrate.

3. The method of claim 1 wherein the step e) further includes attaching a plurality of end caps with the plastic substrate and covering a plurality of holes at the outer surface of the plastic substrate.

4. The method of claim 3 wherein the plurality of holes is designed to form a plurality of brush nodules designed to clean electronic components.

5. The method of claim 1 wherein the PVA powder is coated at the outer surface of the plastic substrate immediately after the melting of the outer surface.

6. The method of claim 1 wherein the plastic substrate is dipped in the organic solvent utilizing a flocking mechanism.

7. The method of claim 1 wherein the plastic substrate is made of polymer plastic.

8. The method of claim 7 wherein the polymer plastic includes but not limited to chlorinated polyvinyl chloride (CPVC).

9. The method of claim 1 wherein the organic solvent includes but not limited to tetrahydrofuran (THF).

10. The method of claim 1 wherein the molding solution is an uncured PVA solution having PVA crystal, formaldehyde, sulfuric acid, deionized water and starch.

11. The method of claim 1 wherein the molding solution is cured at a curing temperature to form a strong bond with the PVA granules firmly embedded at the outer surface.

12. A method for producing a cored brush, the method comprising the steps of:
   a) providing a plastic substrate having an outer surface and a plurality of end caps;
   b) masking the plurality of end caps and melting the plastic substrate outer surface with an organic solvent;
   c) coating the outer surface with polyvinyl alcohol (PVA) powder thereby embedding PVA granules at the outer surface;
   d) removing the masking of the plurality of end caps of the plastic substrate;
   e) loading the plastic substrate into a base of a mold;
   f) placing a mold cavity around the plastic substrate;
   g) filling the mold with a molding solution;
   h) curing the molding solution to form a strong bond with the PVA granules firmly embedded at the outer surface; and
   i) disassembling the mold thereby leaving behind the cored brush.

13. The method of claim 12 wherein the step f) further includes attaching the plurality of end caps with the plastic substrate and covering a plurality of holes at the outer surface of the plastic substrate.

14. The method of claim 13 wherein the plurality of holes is designed to form a plurality of brush nodules designed to clean electronic components.

15. The method of claim 12 wherein the PVA powder is coated at the outer surface of the plastic substrate immediately after the melting of the outer surface.

16. The method of claim 12 wherein the molding solution is cured at a curing temperature for firmly attaching the molding solution with the PVA granules.

17. The method of claim 12 wherein the plastic substrate is made of polymer plastic.

18. The method of claim 17 wherein the polymer plastic includes but not limited to chlorinated polyvinyl chloride (CPVC).

19. The method of claim 12 wherein the plastic substrate is dipped in the organic solvent utilizing a flocking mechanism.

20. The method of claim 12 wherein the organic solvent includes but not limited to tetrahydrofuran (THF).

21. The method of claim 12 wherein the molding solution is an uncured PVA solution having PVA crystal, formaldehyde, sulfuric acid, deionized water and starch.

22. A method for producing a cored brush, the method comprising the steps of:
   a) providing a plastic substrate having an outer surface, a hollow inner surface and a plurality of end caps;
   b) masking the plurality of end caps and melting the plastic substrate outer surface with an organic solvent utilizing a flocking mechanism;
   c) coating the melted outer surface with polyvinyl alcohol powder (PVA) immediately after melting of the outer surface thereby embedding the granules of PVA at the outer surface;
   d) removing the masking of the plurality of end caps of the plastic substrate;
   e) loading the flocked plastic substrate embedded with the PVA granules into a base of a mold;
   f) placing a mold cavity around the flocked plastic substrate and attaching the plurality of end caps with the substrate;
   g) covering a plurality of holes designed to form a plurality of brush nodules at the outer surface;
   h) filling the mold cavity with a molding solution;
   i) curing the mold solution at a curing temperature to form a strong bond with the PVA granules firmly embedded at the outer surface; and
   j) disassembling the mold thereby leaving behind the cored brush.

23. The method of claim 22 wherein the plastic substrate is made of polymer plastic.

24. The method of claim 23 wherein the polymer plastic includes but not limited to chlorinated polyvinyl chloride (CPVC).

25. The method of claim 22 wherein the organic solvent includes but not limited to tetrahydrofuran (THF).

26. The method of claim 22 wherein the plurality of brush nodules is designed to clean electronic components.

27. The method of claim 22 wherein the molding solution is an uncured PVA solution having PVA crystal, formaldehyde, sulfuric acid, deionized water and starch.

* * * * *